US011593686B2

(12) United States Patent
Yang et al.

(10) Patent No.: US 11,593,686 B2
(45) Date of Patent: Feb. 28, 2023

(54) METHODS, SYSTEMS AND APPARATUS TO IMPROVE DEEP LEARNING RESOURCE EFFICIENCY

(71) Applicant: Intel Corporation, Santa Clara, CA (US)

(72) Inventors: Liu Yang, Beijing (CN); Anbang Yao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 729 days.

(21) Appl. No.: 16/480,180

(22) PCT Filed: Mar. 23, 2017

(86) PCT No.: PCT/CN2017/077815
§ 371 (c)(1),
(2) Date: Jul. 23, 2019

(87) PCT Pub. No.: WO2018/170815
PCT Pub. Date: Sep. 27, 2018

(65) Prior Publication Data
US 2019/0370675 A1 Dec. 5, 2019

(51) Int. Cl.
*G06N 3/08* (2006.01)
*G06F 9/38* (2018.01)
(Continued)

(52) U.S. Cl.
CPC ........... *G06N 5/046* (2013.01); *G06F 9/3877* (2013.01); *G06F 16/9024* (2019.01); *G06N 3/08* (2013.01); *H04L 67/1044* (2013.01)

(58) Field of Classification Search
CPC ........ G06N 5/046; G06N 3/08; G06F 9/3877; G06F 16/9024; H04L 67/1044
See application file for complete search history.

(56) References Cited

U.S. PATENT DOCUMENTS

| 2015/0324690 A1 | 11/2015 | Chilimbi et al. |
| 2017/0068888 A1 | 3/2017 | Chung et al. |

(Continued)

FOREIGN PATENT DOCUMENTS

| CN | 106156851 | 11/2016 |
| WO | 2018170815 | 9/2018 |

OTHER PUBLICATIONS

International Searching Authority, "International Search Report," mailed in connection with International Patent Application No. PCT/CN2017/077815, dated Dec. 6, 2017, 4 pages.

(Continued)

*Primary Examiner* — Shirley X Zhang
(74) *Attorney, Agent, or Firm* — Hanley, Flight & Zimmerman, LLC

(57) ABSTRACT

Methods, apparatus, systems and articles of manufacture are disclosed to improve deep learning resource efficiency. An example apparatus includes a graph monitor to select a candidate operation node in response to receiving an operation graph, the operation graph including one or more other operation nodes, a node rule evaluator to evaluate the candidate operation node based on an operating principle, the operating principle to determine an output storage destination of the candidate operation node based on a topology of the operation graph, and a tag engine to tag the candidate operation node with a memory tag value based on the determined output storage destination.

20 Claims, 5 Drawing Sheets

(51) Int. Cl.
*G06F 9/50* (2006.01)
*G06F 16/901* (2019.01)
*G06N 5/046* (2023.01)
*H04L 67/104* (2022.01)

(56) References Cited

U.S. PATENT DOCUMENTS

2017/0161604 A1\* 6/2017 Craddock ............ G06N 3/0454
2017/0293534 A1\* 10/2017 Auvenshine ........ G06F 11/3447

OTHER PUBLICATIONS

International Searching Authority, "Written Opinion," mailed in connection with International Patent Application No. PCT/CN2017/0//815, dated Dec. 6, 2017, 6 pages.
International Searching Authority, "International Preliminary Report on Patentability," mailed in connection with International Patent Application No. PCT/CN2017/077815, dated Sep. 24, 2019, 4 pages.

\* cited by examiner

METHODS, SYSTEMS AND APPARATUS TO IMPROVE DEEP LEARNING RESOURCE EFFICIENCY

CROSS-REFERENCE TO RELATED APPLICATIONS

This patent arises from a 371 Nationalization of International Patent Application Serial No. PCT/CN2017/077815, which is entitled "METHODS, SYSTEMS AND APPARATUS TO IMPROVE DEEP LEARNING RESOURCE EFFICIENCY," and which was filed on Mar. 23, 2017, the subject matter of which is expressly incorporated herein by reference in its entirety.

FIELD OF THE DISCLOSURE

This disclosure relates generally to forward phase deep learning processing, and, more particularly, to methods, systems and apparatus to improve deep learning resource efficiency.

BACKGROUND

In recent years, large amounts of data have been processed by commercial and/or open-source deep learning and/or cognitive toolkits. Such large amounts of data may be unstructured. The available deep learning toolkits typically employ neural networks to expose one or more insights based on the unstructured data by training deep learning algorithms.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
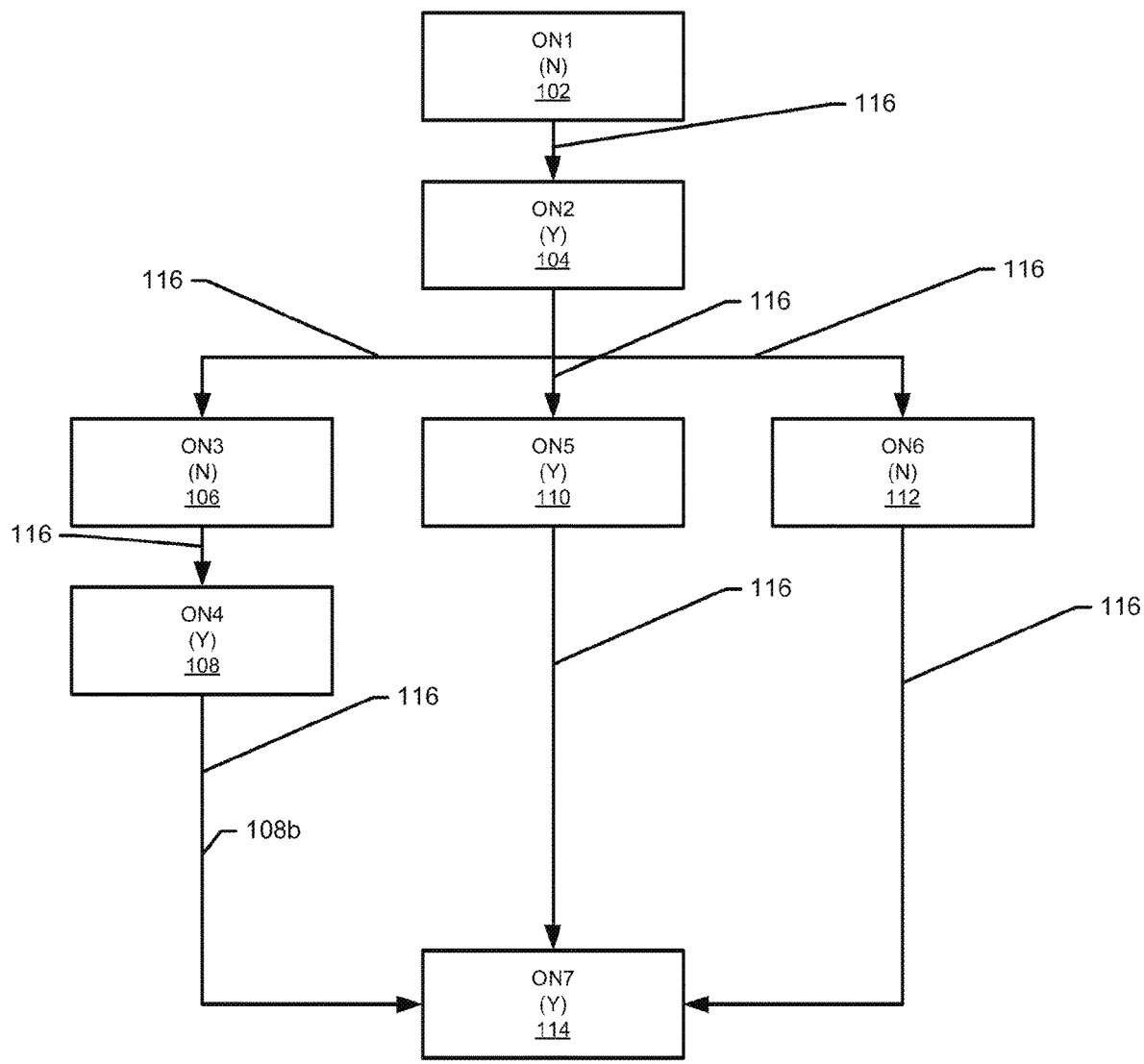
FIG. 1 is a schematic illustration of an example deep network acyclic graph processed by an example deep learning system in accordance with the teachings of this disclosure.

Available deep learning toolkits allow networks (e.g., neural networks) to analyze and weight large amounts of data. When properly analyzed and/or weighted, large amounts of information stored in computer memory can be understood in a manner that achieves target objectives. For example, subjects of images, items in scenes/images, actions or behaviors in scenes/images, speech can be identified. While humans can view an image to identify subjects contained therein and/or activities performed by the subjects contained therein, computers lack the human intuition needed to make similar identifications. Learning algorithms, such as neural networks, are challenged to extract and organize information from input data that makes such identification possible. As such, deep learning toolkits process such information in connection with networks (e.g., neural networks) to derive contextual information in a manner that is similar to how a human would interpret that same information. In other words, deep learning toolkits assist in the development of artificial intelligence.

Example deep learning toolkits include, but are not limited to Caffe®, the Microsoft Cognitive Toolkit (CNTK)®, and TensorFlow®. Generally speaking, deep learning toolkits perform computation using data flow graphs, in which nodes of the flow graphs represent mathematical operations. During a forward phase network analysis, deep learning toolkits save computing results for the operation nodes (sometimes referred to as "layers") of an acyclic graph to a private memory allocated by the toolkit. Typically, a deep learning network includes an acyclic graph having twenty (20) to thirty (30) operation nodes, but other graphs may be considerably larger. Additionally, some operation nodes performing convolution operations may generate outputs having sizes of one gigabyte of data or more. In view of such large memory requirements, deep learning techniques may be operationally prohibitive on some devices, such as small smart devices, mobile telephones, etc.

In some examples, the deep learning toolkits leverage external computing resources, such as parallelization resources of graphics processing units (GPUs) and/or field programmable gate arrays (FPGAs). Utilization of GPUs and/or FPGAs accelerates acyclic graph operation node processing, but such leveraging techniques typically employ platform-sharing frameworks, such as the open computing language (OpenCL) framework. In particular, such frameworks include a data preservation policy that adheres to the memory retention rules of the operation nodes being processed. As such, when the computational outputs of operation nodes are to be stored in private memory, those computational outputs are also transmitted from the external processing resources (e.g., GPUs, FPGAs, etc.) on a bus (e.g., a peripheral component interconnect (PCI) bus) and/or network(s) back to the deep learning toolkit that is executing on one or more processor platforms. In some examples, the computational benefits derived from using such external processing resources are negated by the substantial bandwidth pressures the approach applies to the bus and/or network(s). In other words, utilization of the external processing resources can cause the deep learning toolkit to become input/output (I/O) bounded.

FIG. 1 is a schematic illustration of an example deep network acyclic graph 100. In the illustrated example of FIG. 1, the graph 100 includes seven (7) example operation nodes (ONs). In particular, the example graph 100 includes an example first operation node (ON1) 102, an example second ON (ON2) 104, an example third ON (ON3) 106, an example fourth ON (ON4) 108, an example fifth ON (ON5) 110, an example sixth ON (ON6) 112, and an example seventh ON (ON7) 114. Each of the example ONs in the illustrated example of FIG. 1 include directed arrows (116) to illustrate an ancestor/successor relationship to another node, where the direction of the arrowhead points to the descendent successor node. As used herein, an ON is a successor node to an ON from which it receives data. As used herein, an ON is an ancestor node to another node if it provides its output to that node. In operation, a successor ON can only start its respective computation when all of its ancestor ONs finish their respective computations.

During a deep learning forward phase, the example ONs in the illustrated example of FIG. 1 execute/compute in a topological order starting at ON1 102 and ending at ON7 114, in which each intermediate ON is executed in sequential order to preserve the ancestor/successor relationship. In the illustrated example of FIG. 1, the topological order of the ONs is ON1→ON2→ON3→ON4→ON5→ON6→ON7.

Conventional deep learning toolkits save the computational output of each ON to a private memory before advancing to a subsequent ON in the topological sequence. As such, conventional deep learning toolkits allocate and/or otherwise consume a requisite amount of memory for every ON in the example acyclic graph 100. Additionally, conventional deep learning toolkits must be able to allocate considerable amounts of memory under the assumption that each ON will consume and/or otherwise require some maximum threshold value of space, which is not typically known or otherwise appreciated prior to runtime of a graph. Accordingly, as a number of ONs increases in a conventional deep learning toolkit, so do corresponding memory and data-bus bandwidth requirements. The corresponding memory requirements and/or data-bus bandwidth requirements impose a barrier for deep learning computation for many platforms and devices, particularly those devices that are handheld and, as a result, typically have limited storage resources.

Figure 2:
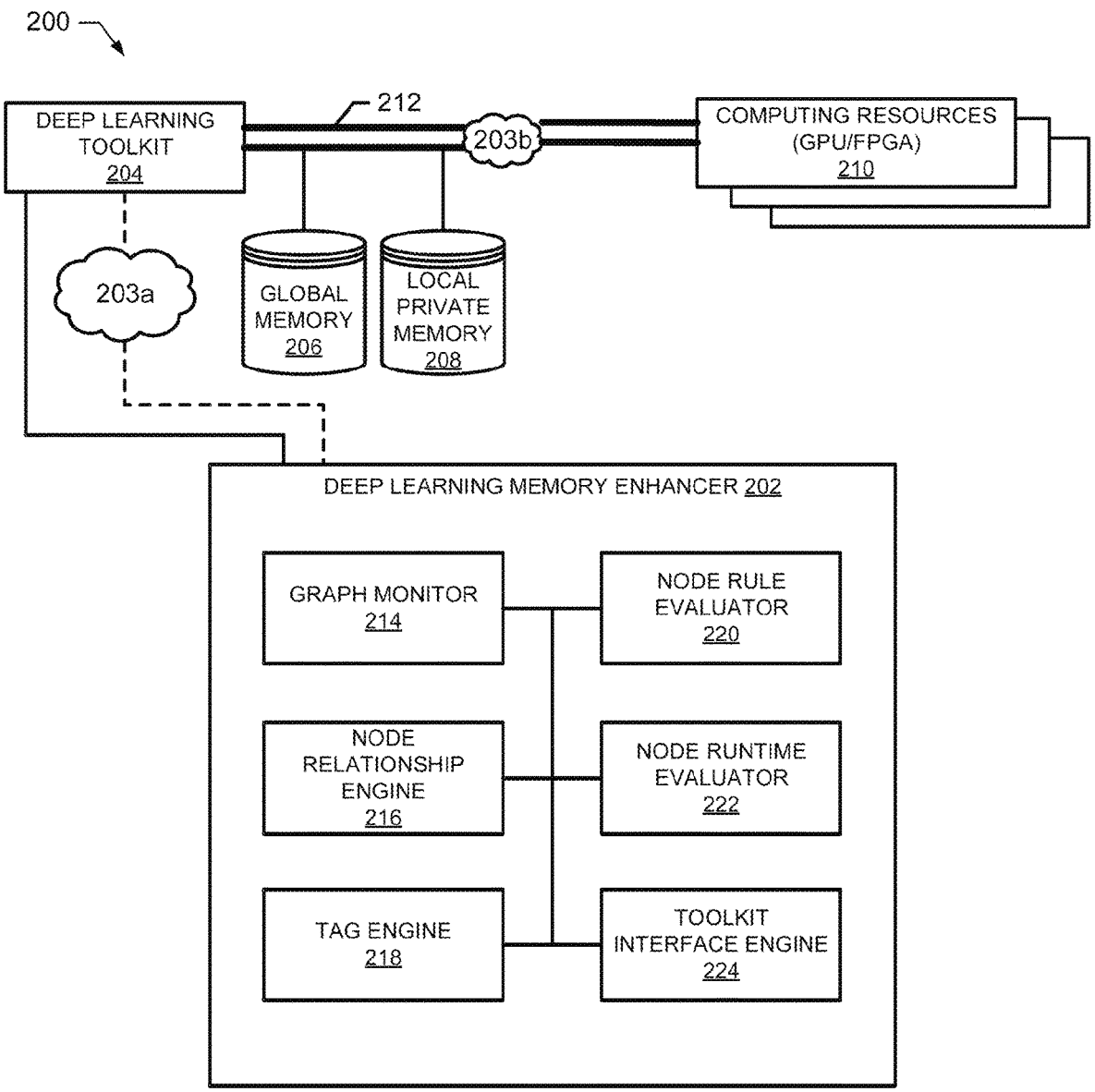
FIG. 2 is an example deep learning system including an example deep learning memory enhancer to improve deep learning resource efficiency.

FIG. 2 illustrates an example deep learning system 200 including a deep learning memory enhancer 202 communicatively connected to an example deep learning toolkit 204. In some examples, the example deep learning toolkit 204 may be communicatively connected to the example deep learning memory enhancer 202 via a network 203a. The example deep learning toolkit 204 is communicatively connected to an example global memory 206, an example local private memory 208, and example computing resources 210 (e.g., GPUs, FPGAs, etc.) via an example bus 212. In some examples, the bus 212 may communicate via an example network 203b, or the example bus 212 may be a direct connection between the example deep learning toolkit 204 and the example computing resources 210. The example deep learning memory enhancer 202 of FIG. 2 includes an example graph monitor 214, an example node relationship engine 216, an example tag engine 218, an example node rule evaluator 220, an example node runtime evaluator 222, and an example toolkit interface engine 224.

In operation, the example deep learning memory enhancer 202 analyzes an operation graph in connection with one or more operating principles. The operating principles disclosed in further detail below include tests of the ONs, the result of which determines whether storage of output from the computation of the ON is needed in local private memory, or whether storage from the computation of the ON can be stored in global memory. Generally speaking, global memory, such as the example global memory 206 of FIG. 2, is relatively inexpensive when compared to local private memory, such as the example local private memory 208 of FIG. 2. In particular, the example global memory 206 includes relatively less memory capacity than the example local private memory 208 because it typically only stores system or platform level information for a period of time equal to a computation duration of the ON of interest. By the time another ON of interest is to compute information, the example global memory 206 provides its contents thereto and may subsequently be replaced with the contents of the other ON computational result(s). In other words, the example global memory 206 is overwritten from one ON to another ON. On the other hand, the example local private memory 208 is larger than the example global memory 206 and must be able to store computational results for any number of ONs within an acyclic graph.

The example graph monitor 214 of FIG. 2 determines if an operation graph is available for evaluation. If so, the example graph monitor 214 selects an operation node (ON) of interest. The example node relationship engine 216 determines whether the selected ON has an ancestor. As disclosed above, an ON is deemed to have an ancestor when the ON receives and/or otherwise retrieves input data from a temporally prior ON. In other words, an ON has an ancestor when its place in an execution order occurs later than an earlier-executing ON in an operation graph and the later ON receives data from the earlier ON (or any intervening ON). If the ON of interest has an ancestor, the example node relationship engine 216 has not yet located and/or otherwise selected the first ON in the operation graph. Therefore, the example node relationship engine 216 continues to search for the beginning of the operation graph by examining an ancestor node.

When the example node relationship engine 216 locates the first ON of the operation graph (e.g., the ON deemed to be the oldest ancestor that does not have any temporally-occurring ONs prior to it), then the example node relationship engine 216 confirms a topological order of the operation graph. Returning briefly to the illustrated example of FIG. 1, each ON of this example is to perform its respective computation(s) in a particular order relative to other ONs in the operation graph that is determined and/or otherwise known prior to any one of the ONs executing their computation(s). In some examples, the operation graph 100 includes metadata that is read by the example node relationship engine 216 to identify the topological order. In other examples, each ON includes nomenclature to identify the topological order, which is represented in the illustrated example of FIG. 1. For example, the example first ON is named "ON1," in which the number "1" is indicative of a relative topological order of the example operation graph 100, and the example second ON is named "ON2," in which the number "2" is indicative of a relative topological order with regard to other ONs in the example operation graph 100.

In some examples, the topological order of the ONs within a particular operation graph is not dependent on and/or otherwise related to a corresponding flow of output data from one ON to another subsequently occurring ON. In other words, although ON4 executes prior to ON5, the output of ON4 is not directed to ON5. As another example, the example second ON named ON2 104 provides its computational output to ON3 106, ON5 110 and ON6 112. Despite ONs ON5 110 and ON6 112 receiving and/or otherwise retrieving the computational output of ON ON2 104, ONs ON5 110 and ON6 112 do not occur (e.g., do not perform their respective computation(s)) immediately subsequent to the operation of ON2 104. Instead, intermediately occurring ON ON4 108 occurs in a topological order prior to the operation of ON ON5 110 and ON6 112.

Returning to the illustrated example of FIG. 2, the example node rule evaluator 220 analyzes the selected ON in view of at least one of three operating principles. As used herein, operating principles represent tests that, when applied to an ON, determine whether the output of the ON should be stored in either (a) the example global memory 206 or (b) the example local private memory 208. In circumstances where the example operating principles indicate that an ON should utilize the example global memory 206 instead of the example local private memory 208, then memory resources may be reduced for a computing platform that is performing evaluations/computations with the example deep learning system 200. In the event that any one of the example operating principles, when applied to an evaluation effort for a candidate ON, indicates that private memory should be used, then there is no further need to continue to apply one or more additional operating principles during the evaluation process.

In operation, the example node rule evaluator 220 applies a first operating principle to determine whether the selected ON of interest has more than one successor (e.g., two or more successors) to receive an output of the selected ON of interest. As described above, a successor (also referred to herein as a "successor node") is an ON that receives and/or otherwise retrieves data previously computed/executed by another ON. As shown in the illustrated example of FIG. 1, the example second ON named ON2 104 provides its output to three (3) separate ONs, namely ON3 106, ON5 110 and ON6 112. For the sake of this example, if ON ON2 104 is the ON of interest being evaluated under the example first operating principle by the example node rule evaluator 220, then the example node rule evaluator 220 determines that ON2 104 has more than one successor (namely ON3 106, ON5 110 and ON6 112 include directed arrows 116 indicating that the output of ON2 104 is received by them). As such, the selected ON of interest (ON2 104 in this example) is tagged (e.g., with a memory-handling tag or memory-handling tag nomenclature) by the example tag engine 218 to cause computational results of ON2 104 to be stored in the example local private memory 208 instead of the example global memory 206. As described above, in the event an operating principle evaluation results in a conclusion to utilize the example local private memory 208, then further evaluations of the selected ON of interest may stop. In other words, there is no further need to evaluate the selected ON of interest in connection with the example second operating principle and/or the example third operating principle, as described in further detail below.

The reason that the example global memory 206 would not be an appropriate data storage destination for ON2 104 is because the example global memory 206 only stores data for the duration of a transition from one ON to the next ON of a particular topological sequence. For example, if the output of ON2 104 were to be stored in the example global memory 206, then the computational results/output of ON2 104 would be available in the global memory 206 as an input to ON3 106. After this transition, the computational output of ON3 106 is written to the example global memory 206, thereby overwriting the results/output by ON2 104 that may have been stored therein. Accordingly, because the computational results/output of ON2 104 are needed by ON3 106, ON5 110 and ON6 112, a more appropriate storage destination is the example local private memory 208, because the local private memory 208 does not relinquish, overwrite and/or otherwise delete storage therein when transitioning from one ON to the next ON.

On the other hand, in the event ON1 102 is the ON of interest (e.g., the candidate ON) being evaluated under the example first operating principle by the example node relationship engine 216, then the example node relationship engine 216 determines that only one subsequent ON requires the computational results of the ON of interest (in this example, only ON2 104 requires the computational output of ON1 102). As such, the example tag engine 218 tags ON1 102 in a manner (e.g., tags with particular memory-handling nomenclature) to cause the computational results of ON1 102 to be stored in the example global memory 206. In other words, example ON1 102 is an ON having only one successor node (i.e., ON2 104). Accordingly, the example global memory 206 is an appropriate and more resource conserving destination for storing the computational output of ON1 102. This determination allows a memory management and bandwidth management improvement over commercially available deep learning toolkits, which traditionally store all computational outputs to a local private memory. In the illustrated example of FIG. 1, ONs are shown with memory-handling tag nomenclature "Y" or "N" to indicate that ON computational output data is to be stored in the example local private memory ("Y") or to be stored in the example global memory ("N"), respectively. While the illustrated example of FIG. 1 includes memory-handling tag nomenclature of "Y" and "N," any other nomenclature may be utilized. For instance, in some examples the memory-handling tag nomenclature may reflect "PRV" for private memory, or "GLB" for global memory.

If the example node rule evaluator 220 evaluates the ON of interest in view of the first operating principle and determines that it does not have more than one successor node, then the example node rule evaluator 220 further evaluates the ON of interest in view of at least one more operating principle. The example node rule evaluator 220 evaluates the ON of interest in view of a second operating principle. In particular, the example second operating principle determines if a successor of the selected ON of interest is also the immediate next ON of the topological sequence of the example operation graph 100. In other words, the example second operating principle determines and/or otherwise identifies whether one of the other ONs is (a) a successor to the selected ON of interest and (b) occurs immediately subsequent to the selected ON of interest. In the event the answer to the example second operating principle is false (e.g., the ON to be computed next in the topological sequence does not receive and/or otherwise retrieve the output of the ON of interest), then the example tag engine 218 tags the ON of interest to cause computational results to be stored in the example local private memory 208 instead of the example global memory 206.

To illustrate, assume that the example node rule evaluator 220 is evaluating OP4 108 of the operation graph 100 in the illustrated example of FIG. 1. While a directed arrow 108b indicates that the computational output of ON4 108 is an input to ON7 114, ON7 114 is not the immediate operational successor of ON4 108 as shown by the topological sequence of the ONs in the example operation graph 100. Instead, the topological order of the example operation graph 100 identifies ON5 110 as the next ON to execute/compute after ON4 108. As described above, the operational sequence of the ONs in the example operation graph 100 is ON1 (102)→ON2 (104)→ON3 (106)→ON4 (108)→ON5 (110)→ON6 (112)→ON7 (114).

Accordingly, because ON7 114 will eventually need the computational output of ON4 108, the global memory 206 cannot be used to store the output of ON4 108 because the computational output of ON4 108 would be overwritten during the next sequential ON in the operational sequence (i.e., when ON5 110 executes) were it stored in the global memory. Thus, to preserve the computational output of ON4 108, the example node relationship engine 216 evaluates ON4 108 in connection with the example second operating principle to discover that this output will eventually be needed in another ON that does not execute immediately after ON4 108 (e.g., there is an intermediate node). The example tag engine 218 then tags ON4 108 with an indicator (e.g., "Y") to preserve the output of ON4 108 in the example local private memory 208.

If the example node rule evaluator 220 evaluates the ON of interest in view of the second operating principle and determines that it does have an immediate successor node (e.g., thereby indicating no need to utilize local private memory), then the example node rule evaluator 220 again evaluates the ON of interest in view of a third operating principle. In particular, the example third operating principle determines if the ON of interest is the last ON in the topological sequence of the example operation graph 100. In the event the answer to the example third operating principle is true (e.g., the ON of interest being evaluated by the example node rule evaluator 220 determines that it is the last ON in the topological sequence), then the example tag engine 218 tags the ON of interest to cause computational results to be stored in the example local private memory 208 instead of the example global memory 206.

On the other hand, if the answer to the example third operating principle is false (e.g., the ON of interest being evaluated by the example node rule evaluator 220 determines that it is not the last ON in the topological sequence), then the example tag engine 218 tags the ON of interest to cause computational results to be stored in the example global memory 206 where the data is accessible to the next immediate successor node, thereby conserving memory resources of the example platform/computer executing the example deep learning toolkit 204.

After the ON of interest has been evaluated in view of the example first, second and third operating principles, the example graph monitor 214 determines whether additional ON(s) of interest of the example operation graph 100 have yet to be evaluated. If at least one ON has yet to be evaluated, then the aforementioned process above repeats in view of the ON(s) of interest. On the other hand, after all ONs in the example operation graph 100 have been evaluated in view of the first, second and third operating principles, the example graph monitor 214 releases the example operation graph 100 to the example deep learning toolkit 204 with corresponding tags on all of the ONs in that graph.

Generally speaking, the aforementioned process prepares the example operation graph 100 and all ONs contained therein prior to runtime. As described in further detail below, the example deep learning memory enhancer 202 also operates in connection with the example deep learning toolkit 204 during runtime after all ONs have a corresponding tag value (e.g., "Y" to indicate computational output is to be saved to a local private memory, "N" to indicate computational output is to be saved to a global memory). In other words, the example deep learning memory enhancer 202 and/or the example node runtime evaluator 222 overrides and/or otherwise instructs the example deep learning toolkit 204 memory usage policies so that memory and bandwidth enhancements can occur during the runtime process when the ONs perform their corresponding computation(s). In some examples, the example deep learning memory enhancer 202 and/or the example node runtime evaluator 222 sends, transmits and/or otherwise makes available an override instruction to the example computing resources 210 to adhere to one or more memory management policies different than one or more default memory management policies imposed by the example deep learning toolkit 204. As such, examples disclosed herein enable a reduction in bandwidth over the example bus 212 and/or the example network 203b.

In response to detecting the beginning of runtime by the example deep learning toolkit 204, the example graph monitor 214 determines if an operation graph (e.g., the example operation graph 100 of FIG. 1) has been selected. If so, the example node relationship engine 216 confirms whether all ONs of the selected operation graph have a corresponding tag (a memory-handling tag). If not, the example deep learning memory enhancer 202 halts and/or otherwise interrupts the runtime and invokes ON tagging operations, as described above. On the other hand, if all the ONs of the selected operation graph have a corresponding memory-handling tag, then the example node runtime evaluator 222 selects an ON for forward phase calculation, and the example toolkit interface engine 224 acquires input data needed for the selected ON (e.g., input data from a memory, input data from an ancestor node, etc.).

When the example toolkit interface engine 224 determines that the deep learning toolkit 204 has completed processing of the selected ON, the example node runtime evaluator 222 determines whether the selected ON is tagged for storage in a local private memory or a global memory. As described above, traditional memory policies of the example deep learning toolkits may be overridden and/or otherwise supplanted with memory utilization instructions based on the example memory-handling tags. In particular, in the event the selected ON is tagged with a "N" indicator, then the example node runtime evaluator 222 stores the result(s) of the ON computation in global memory, and in the event the selected ON is tagged with a "Y" indicator, then the example node runtime evaluator 222 stores the result(s) of the ON computation in local private memory. After the storage occurs for the selected ON, the example graph monitor 214 determines if there are additional ONs in the operation graph and, if so, the process repeats by selecting another ON (e.g., the next sequential ON in the topological order).

By proceeding in the above disclosed manner, it is assured that data to be saved is stored persistently, while data that has only temporary usage is overwritten at the appropriate time.

While an example manner of implementing the example deep learning system 200 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example graph monitor 214, the example node relationship engine 216, the example tag engine 218, the example node rule evaluator 220, the example node runtime evaluator 222, the example toolkit interface engine 224, the example deep learning toolkit 204 and/or, more generally, the example deep learning memory enhancer 202 of FIG. 2 may be implemented by hardware, software, firmware and/or any combination of hardware, software and/or firmware. Thus, for example, any of the example graph monitor 214, the example node relationship engine 216, the example tag engine 218, the example node rule evaluator 220, the example node runtime evaluator 222, the example toolkit interface engine 224, the example deep learning toolkit 204 and/or, more generally, the example deep learning memory enhancer 202 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example graph monitor 214, the example node relationship engine 216, the example tag engine 218, the example node rule evaluator 220, the example node runtime evaluator 222, the example toolkit interface engine 224, the example deep learning toolkit 204 and/or, more generally, the example deep learning memory enhancer 202 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example deep learning memory enhancer 202 of FIG. 2 may include one or more elements, processes and/or devices in addition to, or instead of, those illustrated in FIGS. 1 and 2, and/or may include more than one of any or all of the illustrated elements, processes and devices.

Figure 3:
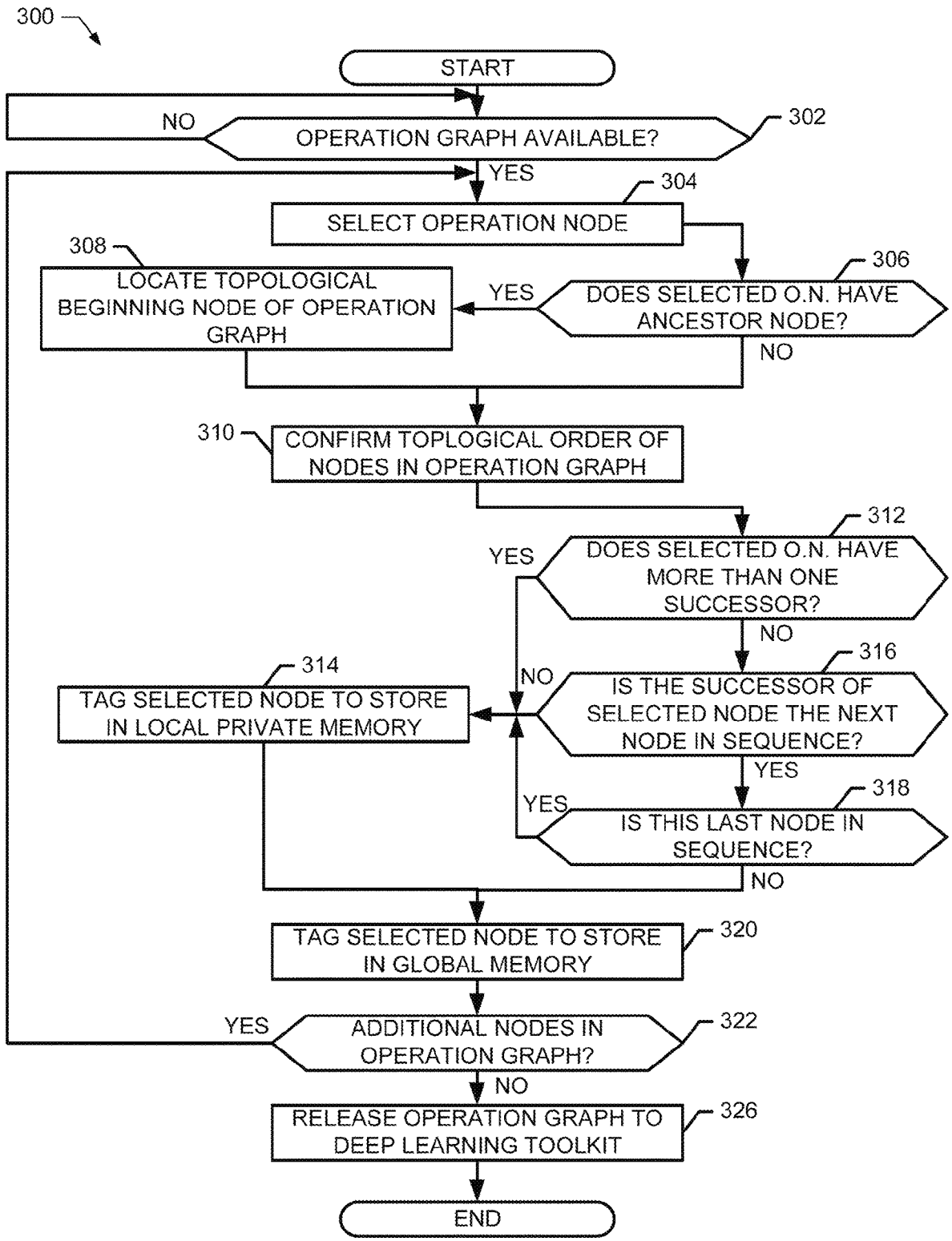
FIGS. 3 and 4 are flowcharts representative of example machine readable instructions that may be executed to implement the example deep learning system and/or deep learning memory enhancer of FIG. 2 to improve deep learning resource efficiency.
Figure 4:
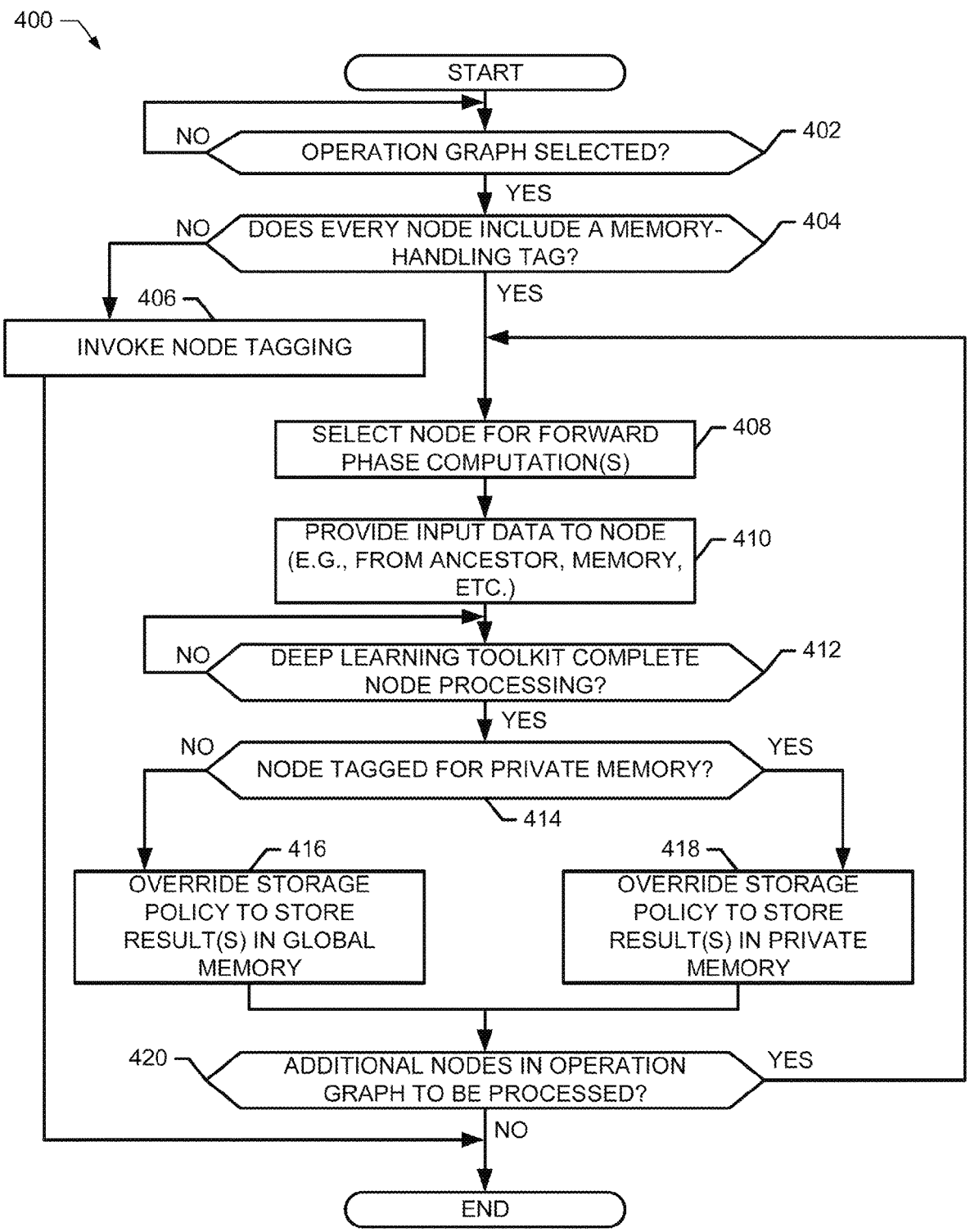

Flowcharts representative of example machine readable instructions for implementing the deep learning system 200 and/or the example deep learning memory enhancer 202 of FIG. 2 are shown in FIGS. 3 and 4. In these examples, the machine readable instructions comprise a program for execution by a processor such as the processor 512 shown in the example processor platform 500 discussed below in connection with FIG. 5. The program(s) may be embodied in software stored on a tangible computer readable storage medium such as a CD-ROM, a floppy disk, a hard drive, a digital versatile disk (DVD), a Blu-ray disk, or a memory associated with the processor 512, but the entire program(s) and/or parts thereof could alternatively be executed by a device other than the processor 512 and/or embodied in firmware or dedicated hardware. Further, although the example program(s) are described with reference to the flowcharts illustrated in FIGS. 3 and 4, many other methods of implementing the example deep learning system 200 and/or the example deep learning memory enhancer 202 may alternatively be used. For example, the order of execution of the blocks may be changed, and/or some of the blocks described may be changed, eliminated, or combined.

As mentioned above, the example processes of FIGS. 3-4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

An example program 300 of FIG. 3 begins at block 302 where the example graph monitor 214 determines if an operation graph is available for evaluation. If not, the example graph monitor 214 waits for an indication that an operation graph is available for evaluation (block 302), but when an operation graph is available, the example graph monitor 214 selects an operation node (ON) (block 304). The example node relationship engine 216 determines if the selected ON has an ancestor (block 306). If so, then the selected ON is not the first ON in the topological sequence of the example operation graph, and the example node relationship engine 216 locates the topological beginning ON of the operation graph (block 308).

If the selected ON does not have an ancestor (block 306), or after the topological beginning ON of the operation graph is identified (block 308), the example node relationship engine 216 confirms a topological order of the ONs in the operation graph (block 310). As described above, each ON will include an indication of its computational/execution sequence during forward progression of the operation graph. For purposes of example and not limitation, the topological sequence of the ONs is shown with a numeric indicator in the illustrated example of FIG. 1, in which the first ON is labeled "ON1" to reflect that it is the first operation to occur.

The example node rule evaluator 220 applies the first operating principle to determine if the selected ON has more than one successor (block 312). If there is more than one successor to the selected ON, meaning that the computational output of the ON will be needed as inputs to two or more other ONs, then the example tag engine 218 tags the selected ON to store computational results to a local private memory (block 314), such as the example local private memory 208 of FIG. 2. Additionally, in the event any one of the example first operating principle, the example second operating principle, or the example third operating principle determines that a local private memory is to be used, control advances to block 322 where the example graph monitor 214 determines if there are more ONs in the operation graph to be evaluated. For example, in the event the first operating principle is tested and/or otherwise evaluated by the example node rule evaluator 220 in view of a selected ON, in which the evaluation results in a need for a local private memory to be used (block 314), then control may advance to block 322 rather than proceed to testing of the example second operating principle (block 316) and/or the example third operating principle (block 318).

Returning to block 312, in the event the example node rule evaluator 220 determines that the selected ON does not have more than one successor node, then the example node rule evaluator 220 determines if a successor node receives the output of the selected ON and is also the immediate next ON of the topological sequence of the operation graph (block 316). If not, then the output of the selected ON will be needed later, but not during the computation of the immediately-next ON. Accordingly, storage to the global memory would not be appropriate because the results would be overwritten during the immediately-next ON computation and, as such, the example tag engine tags the selected ON to store the computational results in the example local private memory 208 (block 314). Control then advances to block 322 to determine if additional ONs are to be evaluated.

On the other hand, in the event the successor node of the selected ON receives and/or otherwise retrieves the output of the selected ON and is also the immediately-next ON in the topological sequence (block 316), the example node rule evaluator invokes the example third operating principle (block 318). In particular, the example third operating principle determines whether the selected ON is the last ON in the topological sequence. If so, then the example tag engine 218 tags the selected ON to cause computational output to be stored in the example local private memory 208 (block 314). If not, then the example tag engine 218 tags the selected ON to cause computational output to be stored in the example global memory 206 (block 320).

The example graph monitor 214 determines if the operation graph (e.g., the example operation graph 100 of FIG. 1) includes additional ONs that have not yet been evaluated (block 322). If there are more ONs that have not yet been tagged to use either the example global memory 206 or the example local private memory 208 (block 322), then control returns to block 304. Otherwise, when all ONs of the example operation graph have been evaluated and tagged, the example graph monitor 214 releases the operation graph to the example deep learning toolkit 204 so that deep learning computation(s) may begin when desired (block 326).

As described above, the example deep learning memory enhancer 202 operates in connection with the example deep learning toolkit 204 during runtime to cause each ON to be stored in either the example global memory 206 or the example local private memory 208. FIG. 4 illustrates an example program 400 to control and/or otherwise direct ON storage to either global memory or local private memory. The example program 400 of FIG. 4 begins at block 402 where the example graph monitor 214 determines if an operation graph has been selected for processing by the example deep learning toolkit 204. If so, the example node relationship engine 216 verifies that all ONs of a selected operation graph have a corresponding memory-handling tag (block 404). In the event one or more of the ONs in the operation graph do not include a corresponding memory-handling tag (e.g., "Y" or "N") (block 404), then the example deep learning memory enhancer 202 invokes example process 300 of FIG. 3 to initiate ON tagging (block 406).

On the other hand, if all of the ONs in the operation graph include a corresponding memory-handling tag (block 404), then the example node runtime evaluator 222 selects an ON for forward phase evaluation (block 408). The example toolkit interface engine 224 provides input data to the selected ON from a source (block 410), such as input data from an ancestor node, the example global memory 206, or the example local private memory 208. The example deep learning toolkit 204 proceeds to operate according to the instructions of the selected ON, and the example toolkit interface engine 224 determines when the example deep learning toolkit 204 completes the processing of the selected ON (block 412). In some examples, the deep learning toolkit 204 invokes one or more external resources, such as GPUs and/or FPGAs when processing the selected ON.

When the example toolkit interface engine 224 determines that the example deep learning toolkit 204 has completed processing of the selected ON (block 412), the example node runtime evaluator 222 determines if the selected ON is tagged for storage in the example local private memory 208 (block 414). If not (e.g., the selected ON is tagged with "N"), then the example node runtime evaluator 222 overrides storage policies of the example deep learning toolkit 204 to store the computational results to the example global memory 206 (block 416). On the other hand, if the selected ON is tagged for storage in the example local private memory 208 (block 414), then the example node runtime evaluator 222 overrides storage policies of the example deep learning toolkit 204 to store the computational results to the example local private memory 208 (block 418). The example graph monitor 214 determines whether additional ONs in the operation graph have not yet been processed (block 420) and if there are more ONs to process in the operation graph, control returns to block 408 to select the next node in the topological sequence of ONs. When all ONs have been processed (block 420), the example program 400 ends.

Figure 5:
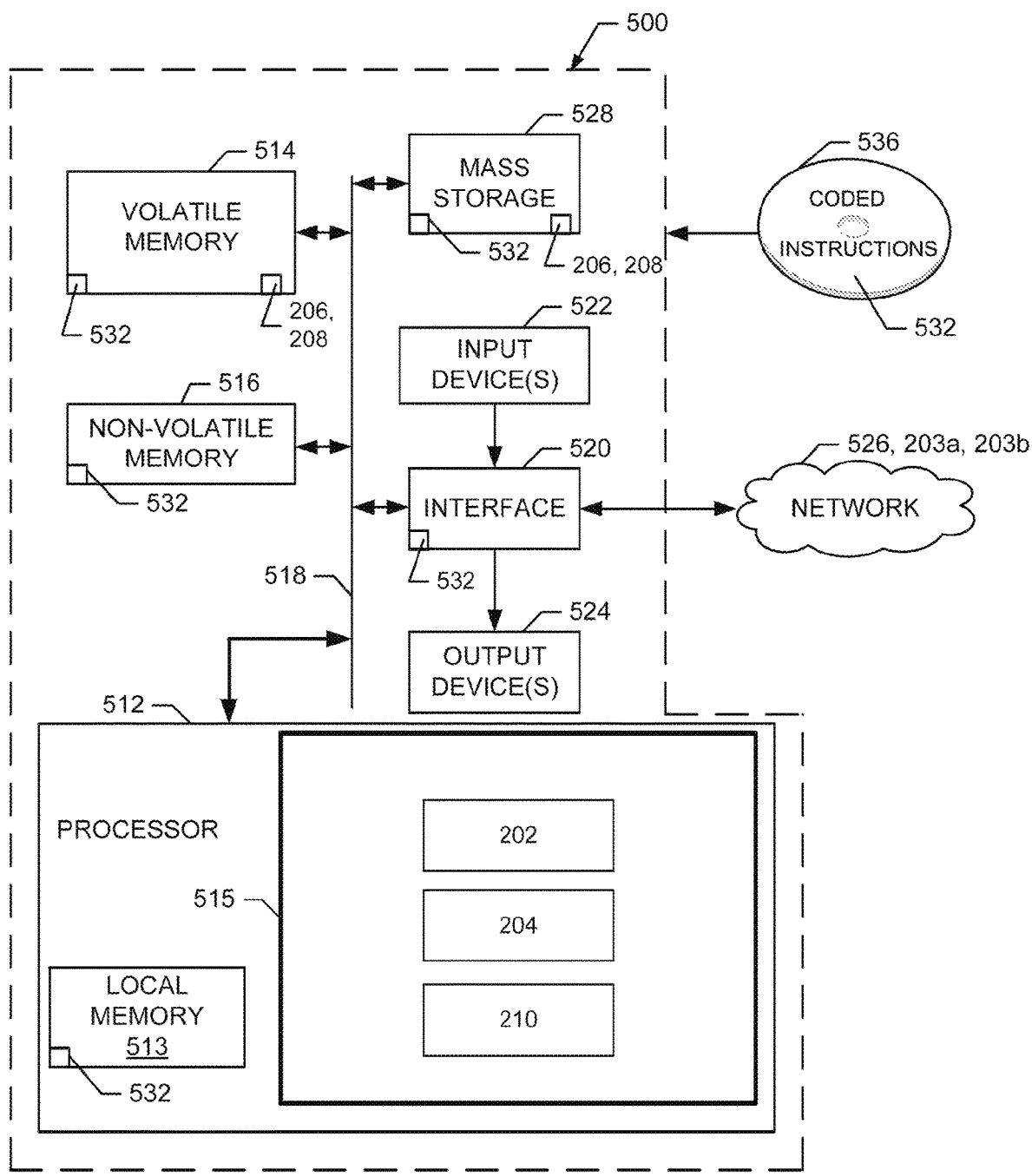
FIG. 5 is a block diagram of an example processor platform structured to execute the example machine readable instructions of FIGS. 3 and/or 4 to implement the example deep learning system and/or deep learning memory enhancer of FIG. 2.

FIG. 5 is a block diagram of an example processor platform 500 capable of executing the instructions of FIGS. 3-4 to implement the example deep learning system 200 and/or the example deep learning memory enhancer 202 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, a gaming console, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. In the illustrated example of FIG. 5, the processor 512 is configured via example instructions 532, which include one or more of the example instructions of FIGS. 3 and/or 4 to implemented the example deep learning memory enhancer 202, the example deep learning toolkit 204, the example computing resources 210, and/or the example deep learning system 200 of FIGS. 1 and/or 2.

The processor 512 of the illustrated example includes a local memory 513 (e.g., a cache). The processor 512 of the illustrated example is in communication with a main memory including a volatile memory 514 and a non-volatile memory 516 via a link 518 (e.g., a bus). The example link 518 may be implemented by a bus, one or more point-to-point connections, etc., or a combination thereof. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint, a voice recognition system, and/or any other human-machine interface. Additionally, some systems, such as the example processor platform 500 of FIG. 5, may allow a user to control the computer system and provide data to the computer system using physical gestures, such as, but not limited to, hand or body movements, facial expressions, and/or face recognition.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID (redundant array of independent disks) systems, and digital versatile disk (DVD) drives.

The example coded instructions 532 of FIGS. 3 and 4 may be stored in the mass storage device 528, in the volatile memory 514, in the non-volatile memory 516, in the local memory 513 and/or on a removable tangible computer readable storage medium such as a CD or DVD.

From the foregoing, it will be appreciated that methods, apparatus and articles of manufacture have been disclosed to improve efficiency of resource usage to a deep learning resource system (however, examples disclosed herein are not limited thereto). In particular, examples disclosed herein override traditional techniques employed by deep learning toolkits that otherwise store all computational results of every operation node in a private memory. Such private memory devices must be large enough for worse-case scenarios, which are not readily ascertainable prior to a runtime operation in which the deep learning toolkit evaluates and/or otherwise computes each node of an acyclic graph. Accordingly, examples disclosed herein improve memory utilization of devices (e.g., platforms, mobile devices, etc.), particularly when such devices have a limited memory capacity. Additionally, because examples herein manage memory utilization in a judicious manner, deep learning analysis operations may operate on relatively smaller devices with limited memory capacity and/or processing resources (e.g., mobile phones). Examples disclosed herein also reduce bandwidth utilization, particularly when external and/or auxiliary computing resources are invoked by deep learning toolkits to process one or more operation nodes of an operation graph.

Example methods, apparatus, systems and articles of manufacture to improve deep learning resource efficiency are disclosed herein. Further examples and combinations thereof include the following.

Example 1 is an apparatus to manage memory utilization of a deep learning toolkit, including a graph monitor to select a candidate operation node in response to receiving an operation graph, the operation graph including one or more other operation nodes, a node rule evaluator to evaluate the candidate operation node based on an operating principle, the operating principle to determine an output storage destination of the candidate operation node based on a topology of the operation graph, and a tag engine to tag the candidate operation node with a memory tag value based on the determined output storage destination.

Example 2 includes the apparatus as defined in example 1, wherein the node rule evaluator selects a first operating principle as the operating principle to determine the output storage destination.

Example 3 includes the apparatus as defined in example 2, wherein the first operating principle is to identify whether the candidate operation node has more than one of the other operation nodes as a successor to receive an output from the candidate operation node.

Example 4 includes the apparatus as defined in example 3, wherein the tag engine is to configure the memory tag value to associate the candidate operation node with a private memory when the candidate operation node is associated with more than one of the other operation nodes as the successor.

Example 5 includes the apparatus as defined in example 3, wherein the tag engine is to configure the memory tag value to associate the candidate operation node with a global memory when the candidate operation node is not associated with more than one successor.

Example 6 includes the apparatus as defined in example 1, wherein the node rule evaluator selects a second operating principle as the operating principle to determine the output storage destination.

Example 7 includes the apparatus as defined in example 6, wherein the second operating principle is to identify whether one of the other operation nodes is (a) a successor to the candidate operation node and (b) occurs immediately subsequent to the candidate operation node.

Example 8 includes the apparatus as defined in example 7, wherein the tag engine is to configure the memory tag value to associate the candidate operation node with a private memory when none one of the other operation nodes (a) is a successor to the candidate operation node, and (b) one of the other operating nodes is a successor, but does not execute immediately subsequent to the candidate operation node.

Example 9 includes the apparatus as defined in example 7, wherein the tag engine is to configure the memory tag value to associate the candidate operation node with a global memory when the one of the other operation nodes (a) is a successor to the candidate operation node and (b) occurs immediately subsequent to the candidate operation node.

Example 10 includes the apparatus as defined in example 1, wherein the node rule evaluator selects a third operating principle as the operating principle to determine the output storage destination.

Example 11 includes the apparatus as defined in example 10, wherein the third operating principle is to identify whether the candidate operation node occurs last in a topological sequence of the operation graph.

Example 12 includes the apparatus as defined in example 11, wherein the tag engine is to configure the memory tag value to associate the candidate operation node with a private memory when the candidate operation node occurs last in the topological sequence.

Example 13 includes the apparatus as defined in example 11, wherein the tag engine is to configure the memory tag value to associate the candidate operation node with a global memory when the candidate operation node occurs last in the topological sequence.

Example 14 includes the apparatus as defined in examples 2, 6 or 10, further including a node runtime evaluator to override a default storage policy of the deep learning toolkit.

Example 15 is a method to manage memory utilization of a deep learning toolkit, including selecting a candidate operation node in response to receiving an operation graph, the operation graph including one or more other operation nodes, evaluating the candidate operation node based on an operating principle, the operating principle to determine an output storage destination of the candidate operation node based on a topology of the operation graph, and tagging the candidate operation node with a memory tag value based on the determined output storage destination.

Example 16 includes the method as defined in example 15, further including selecting a first operating principle as the operating principle to determine the output storage destination.

Example 17 includes the method as defined in example 16, further including identifying whether the candidate operation node has more than one of the other operation nodes as a successor to receive an output from the candidate operation node.

Example 18 includes the method as defined in example 17, further including configuring the memory tag value to associate the candidate operation node with a private memory when the candidate operation node is associated with more than one of the other operation nodes as the successor.

Example 19 includes the method as defined in example 17, further including configuring the memory tag value to associate the candidate operation node with a global memory when the candidate operation node is not associated with more than one successor.

Example 20 includes the method as defined in example 15, further including selecting a second operating principle as the operating principle to determine the output storage destination.

Example 21 includes the method as defined in example 20, further including identifying whether one of the other operation nodes is (a) a successor to the candidate operation node and (b) occurs immediately subsequent to the candidate operation node.

Example 22 includes the method as defined in example 21, further including configuring the memory tag value to associate the candidate operation node with a private memory when none one of the other operation nodes (a) is a successor to the candidate operation node, and (b) one of the other operating nodes is a successor, but does not execute immediately subsequent to the candidate operation node.

Example 23 includes the method as defined in example 21, further including configuring the memory tag value to associate the candidate operation node with a global memory when the one of the other operation nodes (a) is a successor to the candidate operation node and (b) occurs immediately subsequent to the candidate operation node.

Example 24 includes the method as defined in example 15, further including selecting a third operating principle as the operating principle to determine the output storage destination.

Example 25 includes the method as defined in example 24, further including identifying whether the candidate operation node occurs last in a topological sequence of the operation graph.

Example 26 includes the method as defined in example 25, further including configuring the memory tag value to associate the candidate operation node with a private memory when the candidate operation node occurs last in the topological sequence.

Example 27 includes the method as defined in example 25, further including configuring the memory tag value to associate the candidate operation node with a global memory when the candidate operation node occurs last in the topological sequence.

Example 28 includes the method as defined in examples 16, 20 or 24, further including overriding a default storage policy of the deep learning toolkit.

Example 29 is a tangible computer readable storage medium including computer readable instructions that, when executed, cause one or more processors to, at least select a candidate operation node in response to receiving an operation graph, the operation graph including one or more other operation nodes, evaluate the candidate operation node based on an operating principle, the operating principle to determine an output storage destination of the candidate operation node based on a topology of the operation graph, and tag the candidate operation node with a memory tag value based on the determined output storage destination.

Example 30 includes the storage medium as defined in example 29, wherein the computer readable instructions, when executed, further cause the processor to select a first operating principle as the operating principle to determine the output storage destination.

Example 31 includes the storage medium as defined in example 30, wherein the computer readable instructions, when executed, further cause the processor to identify whether the candidate operation node has more than one of the other operation nodes as a successor to receive an output from the candidate operation node.

Example 32 includes the storage medium as defined in example 31, wherein the computer readable instructions, when executed, further cause the processor to configure the memory tag value to associate the candidate operation node with a private memory when the candidate operation node is associated with more than one of the other operation nodes as the successor.

Example 33 includes the storage medium as defined in example 31, wherein the computer readable instructions, when executed, further cause the processor to configure the memory tag value to associate the candidate operation node with a global memory when the candidate operation node is not associated with more than one successor.

Example 34 includes the storage medium as defined in example 29, wherein the computer readable instructions, when executed, further cause the processor to select a second operating principle as the operating principle to determine the output storage destination.

Example 35 includes the storage medium as defined in example 34, wherein the computer readable instructions, when executed, further cause the processor to identify whether one of the other operation nodes is (a) a successor to the candidate operation node and (b) occurs immediately subsequent to the candidate operation node.

Example 36 includes the storage medium as defined in example 35, wherein the computer readable instructions, when executed, further cause the processor to configure the memory tag value to associate the candidate operation node with a private memory when none one of the other operation nodes (a) is a successor to the candidate operation node, and (b) one of the other operating nodes is a successor, but does not execute immediately subsequent to the candidate operation node.

Example 37 includes the storage medium as defined in example 35, wherein the computer readable instructions, when executed, further cause the processor to configure the memory tag value to associate the candidate operation node with a global memory when the one of the other operation nodes (a) is a successor to the candidate operation node and (b) occurs immediately subsequent to the candidate operation node.

Example 38 includes the storage medium as defined in example 29, wherein the computer readable instructions, when executed, further cause the processor to select a third operating principle as the operating principle to determine the output storage destination.

Example 39 includes the storage medium as defined in example 38, wherein the computer readable instructions, when executed, further cause the processor to identify whether the candidate operation node occurs last in a topological sequence of the operation graph.

Example 40 includes the storage medium as defined in example 39, wherein the computer readable instructions, when executed, further cause the processor to configure the memory tag value to associate the candidate operation node with a private memory when the candidate operation node occurs last in the topological sequence.

Example 41 includes the storage medium as defined in example 39, wherein the computer readable instructions, when executed, further cause the processor to configure the memory tag value to associate the candidate operation node with a global memory when the candidate operation node occurs last in the topological sequence.

Example 42 includes the storage medium as defined in examples 30, 34 or 38, wherein the computer readable instructions, when executed, further cause the processor to override a default storage policy of the deep learning toolkit.

Example 43 is a system to manage memory utilization of a deep learning toolkit, the system including means for selecting a candidate operation node in response to receiving an operation graph, the operation graph including one or more other operation nodes, means for evaluating the candidate operation node based on an operating principle, the operating principle to determine an output storage destination of the candidate operation node based on a topology of the operation graph, and means for tagging the candidate operation node with a memory tag value based on the determined output storage destination.

Example 44 includes the system as defined in example 43, further including means for selecting a first operating principle as the operating principle to determine the output storage destination.

Example 45 includes the system as defined in example 44, further including means for identifying whether the candidate operation node has more than one of the other operation nodes as a successor to receive an output from the candidate operation node.

Example 46 includes the system as defined in example 45, further including means for configuring the memory tag value to associate the candidate operation node with a private memory when the candidate operation node is associated with more than one of the other operation nodes as the successor.

Example 47 includes the system as defined in example 45, further including means for configuring the memory tag value to associate the candidate operation node with a global memory when the candidate operation node is not associated with more than one successor.

Example 48 includes the system as defined in example 43, further including means for selecting a second operating principle as the operating principle to determine the output storage destination.

Example 49 includes the system as defined in example 48, further including means for identifying whether one of the other operation nodes is (a) a successor to the candidate operation node and (b) occurs immediately subsequent to the candidate operation node.

Example 50 includes the system as defined in example 49, further including means for configuring the memory tag value to associate the candidate operation node with a private memory when none one of the other operation nodes (a) is a successor to the candidate operation node, and (b) one of the other operating nodes is a successor, but does not execute immediately subsequent to the candidate operation node.

Example 51 includes the system as defined in example 49, further including means for configuring the memory tag value to associate the candidate operation node with a global memory when the one of the other operation nodes (a) is a successor to the candidate operation node and (b) occurs immediately subsequent to the candidate operation node.

Example 52 includes the system as defined in example 43, further including means for selecting a third operating principle as the operating principle to determine the output storage destination.

Example 53 includes the system as defined in example 52, further including means for identifying whether the candidate operation node occurs last in a topological sequence of the operation graph.

Example 54 includes the system as defined in example 53, further including means for configuring the memory tag value to associate the candidate operation node with a private memory when the candidate operation node occurs last in the topological sequence.

Example 55 includes the system as defined in example 53, further including means for configuring the memory tag value to associate the candidate operation node with a global memory when the candidate operation node occurs last in the topological sequence.

Example 56 includes the system as defined in examples 44, 48 or 52, further including means for overriding a default storage policy of the deep learning toolkit.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage memory utilization of a deep learning toolkit, the apparatus comprising:
   graph monitor circuitry to select a candidate operation node in response to receiving an operation graph, the operation graph including one or more other operation nodes;
   node rule evaluator circuitry to evaluate the candidate operation node based on an operating principle, the operating principle to determine an output storage destination of the candidate operation node based on a topology of the operation graph; and
   tag engine circuitry to tag the candidate operation node with a memory tag value based on the determined output storage destination.

2. The apparatus as defined in claim 1, wherein the node rule evaluator circuitry is to select a first operating principle as the operating principle to determine the output storage destination.

3. The apparatus as defined in claim 2, wherein the first operating principle is to identify whether the candidate operation node has more than one of the other operation nodes as a successor to receive an output from the candidate operation node.

4. The apparatus as defined in claim 3, wherein the tag engine circuitry is to configure the memory tag value to associate the candidate operation node with a global memory when the candidate operation node is not associated with more than one successor, the global memory to replace the output from the candidate operation node until a successor node is invoked.

5. The apparatus as defined in claim 1, wherein the node rule evaluator circuitry is to select a second operating principle as the operating principle to determine the output storage destination.

6. The apparatus as defined in claim 5, wherein the second operating principle is to identify whether one of the other operation nodes is (a) a successor to the candidate operation node and (b) occurs immediately subsequent to the candidate operation node.

7. The apparatus as defined in claim 6, wherein the tag engine circuitry is to configure the memory tag value to associate the candidate operation node with a global memory when the one of the other operation nodes (a) is a successor to the candidate operation node and (b) occurs immediately subsequent to the candidate operation node, the global memory to replace the output from the candidate operation node until a successor node is invoked.

8. The apparatus as defined in claim 1, wherein the node rule evaluator circuitry is to select a third operating principle as the operating principle to determine the output storage destination.

9. The apparatus as defined in claim 8, wherein the third operating principle is to identify whether the candidate operation node occurs last in a topological sequence of the operation graph.

10. A method to manage memory utilization of a deep learning toolkit, the method comprising:
    selecting, by executing an instruction with a processor, a candidate operation node in response to receiving an operation graph, the operation graph including one or more other operation nodes;
    evaluating, by executing an instruction with the processor, the candidate operation node based on an operating principle, the operating principle to determine an output storage destination of the candidate operation node based on a topology of the operation graph; and
    tagging, by executing an instruction with the processor, the candidate operation node with a memory tag value based on the determined output storage destination.

11. The method as defined in claim 10, further including selecting a first operating principle as the operating principle to determine the output storage destination.

12. The method as defined in claim 11, further including identifying whether the candidate operation node has more than one of the other operation nodes as a successor to receive an output from the candidate operation node.

13. The method as defined in claim 12, further including configuring the memory tag value to associate the candidate operation node with a private memory when the candidate operation node is associated with more than one of the other operation nodes as the successor.

14. The method as defined in claim 10, further including selecting a second operating principle as the operating principle to determine the output storage destination.

15. The method as defined in claim 14, further including identifying whether one of the other operation nodes is (a) a successor to the candidate operation node and (b) occurs immediately subsequent to the candidate operation node.

16. The method as defined in claim 15, further including configuring the memory tag value to associate the candidate operation node with a private memory when none one of the other operation nodes (a) is a successor to the candidate operation node, and (b) one of the other operating nodes is a successor, but does not execute immediately subsequent to the candidate operation node.

17. A non-transitory computer readable storage medium comprising computer readable instructions that, when executed, cause one or more processors to, at least:
    select a candidate operation node in response to receiving an operation graph, the operation graph including one or more other operation nodes;
    evaluate the candidate operation node based on an operating principle, the operating principle to determine an output storage destination of the candidate operation node based on a topology of the operation graph; and
    tag the candidate operation node with a memory tag value based on the determined output storage destination.

18. The storage medium as defined in claim 17, wherein the computer readable instructions, when executed, further cause the processor to select a first operating principle as the operating principle to determine the output storage destination.

19. The storage medium as defined in claim 17, wherein the computer readable instructions, when executed, further cause the processor to select a second operating principle as the operating principle to determine the output storage destination.

20. The storage medium as defined in claim 17, wherein the computer readable instructions, when executed, further cause the processor to select a third operating principle as the operating principle to determine the output storage destination.

* * * * *